(12) United States Patent
Waliwitiya

(10) Patent No.: US 11,685,700 B2
(45) Date of Patent: Jun. 27, 2023

(54) NITROGEN STABILIZING COMPOSITIONS

(71) Applicant: Active AgriScience Inc., Saskatoon (CA)

(72) Inventor: Ranil Waliwitiya, Surrey (CA)

(73) Assignee: Active Agriscience Inc., Saskatoon (CA)

( * ) Notice: Subject to any disclaimer, the term of this patent is extended or adjusted under 35 U.S.C. 154(b) by 223 days.

(21) Appl. No.: 17/327,207

(22) Filed: May 21, 2021

(65) Prior Publication Data

US 2022/0371968 A1 Nov. 24, 2022

(51) Int. Cl.
| | |
|---|---|
| C05D 1/00 | (2006.01) |
| C05G 3/90 | (2020.01) |
| C05D 9/02 | (2006.01) |
| C05C 9/00 | (2006.01) |
| C09K 15/28 | (2006.01) |

(52) U.S. Cl.
CPC ............... *C05D 1/00* (2013.01); *C05C 9/005* (2013.01); *C05D 9/02* (2013.01); *C05G 3/90* (2020.02); *C09K 15/28* (2013.01)

(58) Field of Classification Search
None
See application file for complete search history.

(56) References Cited

U.S. PATENT DOCUMENTS

2017/0362140 A1* 12/2017 Sculthorpe ............ C05C 9/005
2019/0048260 A1* 2/2019 Waliwitiya ............ C09K 15/06

FOREIGN PATENT DOCUMENTS

CN 107459410 A * 12/2017 ............ C05C 9/00
CN 111116277 A * 5/2020 ............ C05C 9/00

* cited by examiner

*Primary Examiner* — Wayne A Langel
(74) *Attorney, Agent, or Firm* — Oyen Wiggs Green & Mutala LLP

(57) ABSTRACT

A nitrogen stabilizing composition is provided. The composition includes 6% to 18% N-(n-butyl) thiophosphoric triamide (NBPT), 1% to 6% 3,4-dimethyl pyrazole phosphate (DMPP), and a solvent, wherein the ratio of NBPT to DMPP is between about 5.5:1 and 6.5:1.

17 Claims, 5 Drawing Sheets

| Broadcast Urea Treatment (L/1000 kg) | N loss as ammonia | | N loss as nitrate | | N loss as nitrous oxide | | Wheat Biomass | |
|---|---|---|---|---|---|---|---|---|
| | Cumulative ammonia loss (kg N/ha) | % N savings compared to untreated | Cumulative nitrate loss (kg N/ha) | % N savings compared to untreated | Cumulative nitrous oxide loss (kg N/ha) | % N savings compared to untreated | Biomass | % change compared to untreated |
| Untreated | 11.44 | | 37 | | 0.11 | | 49.5 | |
| 1.2 | 7.9 | 30.9 | 40.5 | 9.5 | 0.10 | 9.1 | 54.1 | 9.2 |
| 1.8 | 7.86 | 31.3 | 38.9 | 5.1 | 0.11 | 0 | 53.5 | 8.1 |
| 2.4 | 7.3 | 36.2 | 35.7 | 3.4 | 0.08 | 28.3 | 53.0 | 7.0 |

FIG. 1

| Broadcast Urea Treatment (L/1000 kg) | N loss as ammonia | | N loss as nitrate | | N loss as nitrous oxide | | Wheat Biomass | |
|---|---|---|---|---|---|---|---|---|
| | Cumulative ammonia loss (kg N/ha) | % N savings compared to untreated | Cumulative nitrate loss (kg N/ha) | % N savings compared to untreated | Cumulative nitrous oxide loss (kg N/ha) | % N savings compared to untreated | Biomass | % change compared to untreated |
| Untreated | 11.44 | | 37 | | 0.11 | | 49.5 | |
| 1.2 | 7.9 | 30.9 | 40.5 | 9.5 | 0.10 | 9.1 | 54.1 | 9.2 |
| 1.8 | 7.86 | 31.3 | 38.9 | 5.1 | 0.11 | 0 | 53.5 | 8.1 |
| 2.4 | 7.3 | 36.2 | 35.7 | 3.4 | 0.08 | 28.3 | 53.0 | 7.0 |

FIG. 2

| UAN Treatment (L/1000 L) | N loss as ammonia | | N loss as nitrate | | N loss as nitrous oxide | | Wheat Biomass | |
|---|---|---|---|---|---|---|---|---|
| | Cumulative ammonia loss (kg N/ha) | % N savings compared to untreated | Cumulative nitrate loss (kg N/ha) | % N savings compared to untreated | Cumulative nitrous oxide loss (kg N/ha) | % N savings compared to untreated | Biomass | % change compared to untreated |
| Untreated | 7.22 | | 34.4 | | 0.07 | | 50.4 | |
| 1 | 4.94 | 31.6 | 39.4 | 14.4 | 0.08 | -14.3 | 53.9 | 7.1 |
| 1.5 | 5.25 | 27.3 | 35.9 | 4.3 | 0.07 | 0 | 54.6 | 8.4 |
| 2 | 5.97 | 17.3 | 43.0 | 25.1 | 0.06 | 14.3 | 52.7 | 4.6 |

| Banded Urea Treatment (L/1000 kg) | N loss as ammonia | | N loss as nitrate | | N loss as nitrous oxide | | Wheat Biomass | |
|---|---|---|---|---|---|---|---|---|
| | Cumulative ammonia loss (kg N/ha) | % N savings compared to untreated | Cumulative nitrate loss (kg N/ha) | % N savings compared to untreated | Cumulative nitrous oxide loss (kg N/ha) | % N savings compared to untreated | Biomass | % change compared to untreated |
| Untreated | 1.15 | | 33.8 | | 0.49 | | 57.5 | |
| 1.2 | 1.36 | -18.3 | 34.2 | 1.2 | 0.15 | 69.4 | 50.7 | -11.9 |
| 1.8 | 1.19 | -3.5 | 34.4 | 1.9 | 0.16 | 67.4 | 52.4 | -8.9 |
| 2.4 | 1.21 | -5.2 | 43.8 | 29.5 | 0.12 | 75.5 | 57.4 | -0.1 |
| Control | 1.29 | -12.2 | 25.8 | -24.7 | | | 50.4 | |

FIG. 3

| Active Stabilizer Plus Stability with different acids |||||||||||||||
|---|---|---|---|---|---|---|---|---|---|---|---|---|---|---|
| | | pH ||| Clarity ||| Separation ||| Precipitation |||
| Acid Combination (Citric acid kept at 1%) | Formula content (%) | t = 0 | t = 1 week | t = 1 month | t = 0 | t = 1 week | t = 1 month | t = 0 | t = 1 week | t = 1 month | t = 0 | t = 1 week | t = 1 month |
| Hydrochloric (10%) | 1 | 3.9 | 4.2 | 4.2 | Dark blue | Dark blue | Dark blue | Clear | Separated oil layer | Separated oil layer | Clear | Slight ppt | Same level of ppt |
| | 2 | 2.1 | 2.4 | 2.5 | Dark blue | Dark blue | Dark blue | Clear | Separated oil layer | Separated oil layer | Clear | Slight ppt | More ppt |
| Sulfuric (10%) | 1 | 2.7 | 2.8 | 2.8 | Dark blue | Dark blue | Dark blue | Clear | Separated oil layer | Separated oil layer | Clear | Slight ppt | Slightly higher ppt |
| | 2 | 1.4 | 1.4 | 1.6 | Dark blue | Dark blue | Dark blue | Clear | Separated oil layer | Separated oil layer | Clear | Slight ppt | Slightly higher ppt |
| Phosphoric (75%) | 1 | 4.1 | 4.3 | 4.5 | Dark blue | Dark blue | Dark blue | Clear | Separated oil layer | Separated oil layer | Clear | Slight ppt | Slightly higher ppt |
| | 2 | 3.2 | 3.6 | 3.7 | Dark blue | Dark blue | Dark blue | Clear | Separated oil layer | Separated oil layer | Clear | Slight ppt | Slightly higher ppt |
| Lactic (pure) | 1 | 7.1 | 7.1 | 7.1 | Dark blue | Dark blue | Dark blue | Clear | No separation | Slight separation | Clear | Clear | Clear |
| | 2 | 5.2 | 5.2 | 5.2 | Dark blue | Dark blue | Dark blue | Clear | No separation | No separation | Clear | Clear | Clear |

FIG. 6

NITROGEN STABILIZING COMPOSITIONS

FIELD OF THE INVENTION

This invention relates to compositions for reducing nitrogen loss of fertilizers used in agriculture.

BACKGROUND

Urea and urea ammonium nitrate (UAN) are the two most widely used nitrogen fertilizers in commercial crop production worldwide. Utilization of nitrogen from the two sources is greatly reduced by losses that occur after fertilizer application. These nitrogen losses are mainly due to biological processes.

One process is hydrolysis of urea by the enzyme urease produced by soil bacteria. Urea hydrolysis results in ammonium ions, which in turn convert to ammonia gas that releases from the soil. Such ammonia volatilization depends mainly on soil properties (soil pH, cation exchange capacity, organic matter and moisture content) and weather conditions (wind, rain, temperature). Ammonia volatilization can account for over 35% of nitrogen lost from urea.

Another process is nitrification where ammonium ions from urea hydrolysis convert to nitrites and nitrates ions. Nitrate ions are less stable compared to ammonium ions and can be easily subjected to leaching and runoff. Meta-analysis of published research shows that between 2-80% of nitrogen loss beyond ammonia volatilization can occur due to nitrification processes.

A further process of nitrogen loss is de-nitrification, where nitrites and nitrates are converted to nitrogen gas and nitrous oxide gas, which in turn escape from soil. Estimated nitrogen loss due to de-nitrification is less than 1% of nitrogen applied as urea. However, nitrous oxide is a potent greenhouse gas and its potential damage is estimated to be between 280-300 times that of carbon dioxide.

Ammonia volatilization, nitrification and de-nitrification can therefore significantly reduce the efficacy of nitrogen applied as urea, and also cause deleterious environmental effects.

Urease inhibitors and nitrification inhibitors are currently the main solutions to prevent nitrogen losses from urea and UAN.

N-Butyl thio-phosphoric triamide (NBPT) is a common urease inhibitor used by the agricultural industry. Different formulations of NBPT have been proposed but mainly focus on NBPT percentage and the efficacy of NBPT in reducing ammonia volatilization. Most known NBPT formulations contain the highest percentage of NBPT that can be achieved in solution. NBPT is expensive and its formulation involves many different solvents, typically without water. Currently available NBPT-based formulations are typically extremely expensive and do not yield a return on investment if only the portion of nitrogen saved is considered. Therefore, the agriculture industry has yet to widely adopt NBPT formulations.

Currently, only about 25% of applied urea is treated with urease inhibitors and nitrification inhibitors.

Estimated nitrogen and economic losses and $CO_2$ generation, and estimated nitrogen and economic savings through use of nitrogen management, are shown in the table below for the year 2019.

| Nitrogen Loss Calculations for 2019 Worldwide Urea Consumption | |
|---|---|
| 2019 world urea consumption | 198 million metric tons |
| Nitrogen applied | 91 million metric tons |
| Minimum nitrogen loss (35%) | 31.9 million metric tons |
| Minimum nitrogen loss as urea | 69.3 million metric tons |
| Economic loss at USD 350/mt | USD 2.43 billion |
| Possible nitrogen savings if nitrogen management used (at 50%) | 16 million metric tons |
| Possible nitrogen savings in terms of urea, if used nitrogen management (at 50%) | 34.8 million metric tons |
| Economic value of the urea saved by using nitrogen management | $1.2 billion |
| $CO_2$ generated by 69.3 million metric tons of urea | 346.5 million metric tons |
| $CO_2$ generated for $N_2O$ portion of 69.3 million metric tons of urea | 194 million metric tons |
| Total $CO_2$ generated by urea loss | 540.5 million metric tons |

Compositions for reducing nitrogen loss from nitrogen fertilizers are therefore desirable.

SUMMARY

The inventions described herein have many aspects, some of which relate to compositions and methods for reducing nitrogen volatilization.

In one aspect, a nitrogen stabilizing composition is provided. The composition comprises: 6% to 18% N-(n-butyl) thiophosphoric triamide (NBPT); 1% to 6% 3,4-dimethyl pyrazole phosphate (DMPP); and a solvent, wherein the ratio of NBPT to DMPP is between 5.5:1 and 6.5:1. The ratio of NBPT to DMPP may be 6:1. The composition may comprise: 12% NBPT and 2% DMPP; and 0.5% to 5% lactic acid and 0.5% to 4% citric acid, or 2% lactic acid and 1% citric acid; 1% to 10% polysorbate 20, 0.5% to 5% lactic acid and 0.1% to 1% soy lecithin, or 5% polysorbate 20, 2% lactic acid and 0.2% soy lecithin; 0.5% to 2% MEA, or 1% MEA. The composition may also comprise a micronutrient concentrate comprising potassium methanolate, chelated zinc, chelated manganese, boron and chelated iron. The ratio of chelated zinc to chelated manganese may be 1:1.

In another aspect, a nitrogen stabilizing composition is provided. The composition comprise: 6% to 18% N-(n-butyl) thiophosphoric triamide (NBPT); 1% to 6% 3,4-dimethyl pyrazole phosphate (DMPP), wherein the ratio of NBPT to DMPP is between 5.5:1 and 6.5:1; 1% to 10% polysorbate 20; 0.5% to 5% lactic acid; 0.5% to 4% citric acid; 0.5% to 2% monoethanolamine (MEA); 0.1% to 1% soy lecithin; 0.1% to 1% micronutrient concentrate comprising potassium methanolate, chelated zinc, chelated manganese, boron and chelated iron; and a solvent. The ratio of NBPT to DMPP may be 6:1. The composition may comprise 12% NBPT; 2% DMPP; 2% lactic acid; 1% citric acid; 5% polysorbate 20; 0.2% soy lecithin; 1% MEA; 0.058% of the micronutrient concentrate; and the solvent may comprise N-methyl-2-pyrrolidone (NMP), propylene glycol and ethylene glycol.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting example embodiments of the invention.

FIG. 1 is a table showing ammonia emissions, nitrate leaching, nitrous oxide emissions, and wheat biomass yield of soil broadcast fertilized with urea coated with a composition according to an embodiment at application rates of 1.2 L/1000 kg, 1.8 L/1000 kg and 2.4 L/1000 kg.

FIG. 2 is a table showing ammonia emissions, nitrate leaching, nitrous oxide emissions, and wheat biomass yield of soil fertilized with urea ammonium nitrate (UAN) solution combined with an embodiment at application rates of 1 L/1000 L, 1.5 L/1000 L and 2 L/1000 L.

FIG. 3 is table showing ammonia emissions, nitrate leaching, nitrous oxide emissions, and wheat biomass yield of soil band fertilized with urea coated with an embodiment at application rates of 1.2 L/1000 kg, 1.8 L/1000 kg and 2.4 L/1000 kg.

FIG. 6 is a table showing stability test results of different acid combinations in modified formulations of Active Stabilizer Plus, including combinations of 1% citric acid with: 1% and 2% hydrochloric acid, 1% and 2% sulfuric acid, 1% and 2% phosphoric acid, and 1% lactic acid.

DETAILED DESCRIPTION

Figure 4:
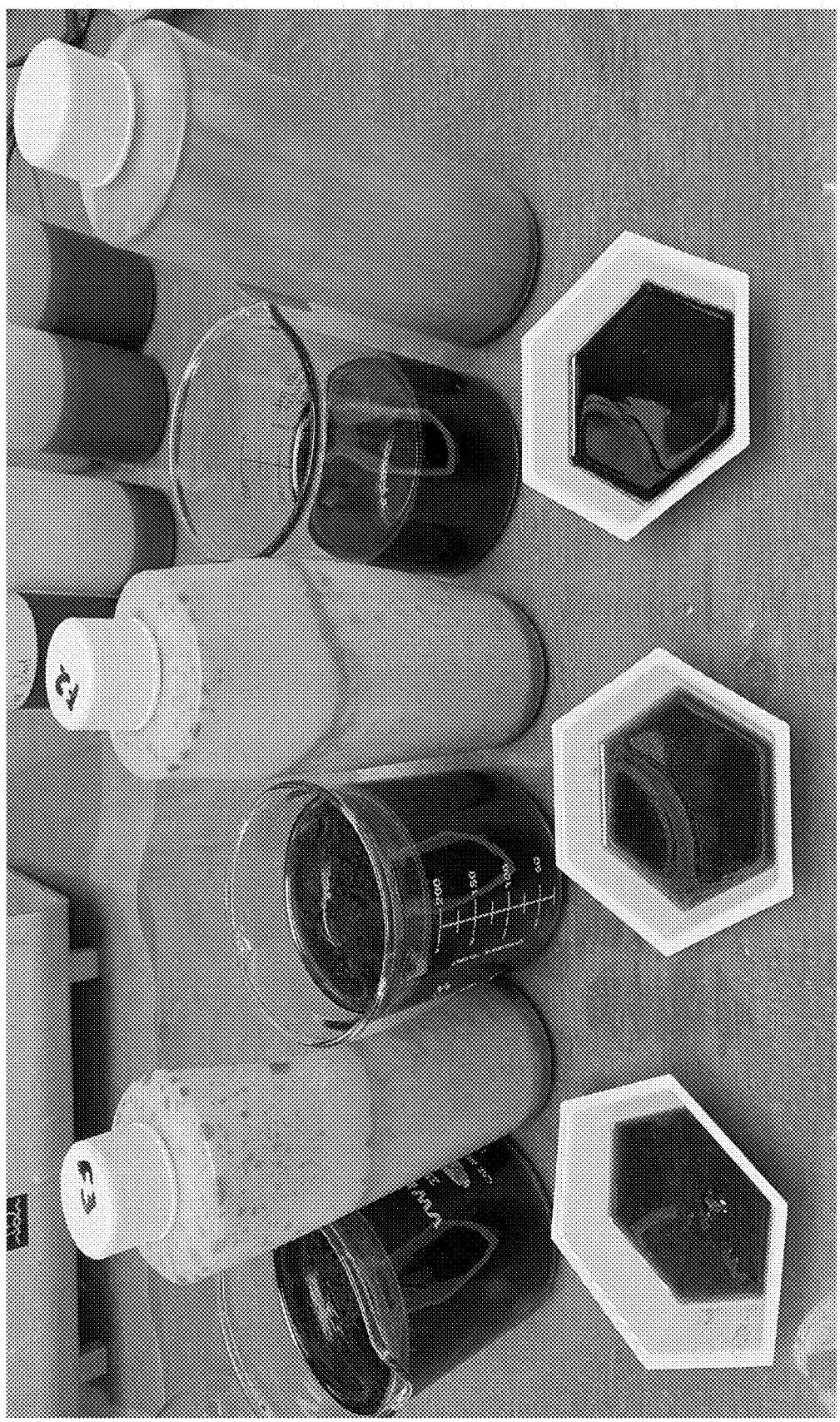
FIG. 4 is a photo showing stability test results of different ratios of NBPT to DMPP, in particular from left to right: (i) a modified formulation of Active Stabilizer Plus with 15% NBPT to 3% DMPP (5:1 NBPT:DMPP ratio), (ii) a modified formulation of Active Stabilizer Plus with 21% NBPT to 3% DMPP (7:1 NBPT:DMPP ratio), and (iii) unmodified Active Stabilizer Plus (6:1 NBPT:DMPP ratio).

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, a % value means the weight percent of a component of the composition with respect to the total weight of said composition.

Known liquid formulations of NBPT for use in reducing nitrogen volatilization such as those currently commercially available comprise approximately 24% of NBPT by total weight of solution. Since NBPT is a solid compound, coating NBPT onto urea requires NBPT to be introduced into a liquid carrier prior to being mixed with urea. Accordingly, the greater the amount of NBPT used in a particular formulation, the greater amount of solvent required, and both factors increase costs.

The inventor has determined that NBPT in known commercially available liquid formulations precipitate at room temperature over time. The inventor has also determined that known commercially available liquid formulations of NBPT form undesirable dust particulates comprising NBPT. The inventor has further determined that the dust particulates adhere and cake to components of the mixing machinery during blending of the formulations with urea to coat the urea, as well as to components of the applicator machinery during application of the coated urea to soil, thereby reducing the availability of NBPT for coating and inhibiting even coating of the urea.

One aspect relates to a nitrogen stabilizing composition comprising a combination of NBPT and the nitrification inhibitor 3,4-dimethyl pyrazole phosphate (DMPP) in a ratio that maintains both compounds in solution. The ratio of NBPT to DMPP may be about 5.5:1 to about 6.5:1, or about 6:1. The inventor has determined that NBPT and DMPP are surprisingly and unexpectedly stable together in solution at this narrow ratio range compared to other ratios, as demonstrated below in the Examples.

At NBPT to DMPP ratios of about 5.5:1 to about 6.5:1, or about 6:1, NBPT may range from about 6% to about 18%, or be about 12%, and DMPP may range from about 1% to about 6%, or be about 2% in the composition according to some embodiments.

The combination of NBPT and DMPP are dissolved in solvent. The solvent may be a combination of N-methyl pyrrolidone (NMP), propylene glycol and ethylene glycol. In some embodiments the solvent may be about 10% to about 30% NMP, about 20% to 40% propylene glycol and 5% to 25% ethylene glycol. In some embodiments the solvent may be about 20% NMP, about 30% propylene glycol and 15.3% ethylene glycol.

In other embodiments the solvent may be one or more of a pyrrolidone other than NMP, an alkylene or polyalkylene glycol (e.g. ethylene glycol, propylene glycol, and butylene glycol), morpholine, glycerine, dimethyl sulfoxide, an alkanolamine (e.g. ethanolamine, diethanolamine, dipropanolamine, methyl diethanolamine, monoisopropanolamine and triethanolamine) and/or an alkyl lactate (e.g. ethyl lactate, propyl lactate, and butyl lactate).

The nitrogen stabilizing composition also includes a combination of lactic acid and citric acid for pH buffering to maintain a stable pH. The inventor has determined that the combination of lactic acid and citric surprising and unexpectedly extends shelf life of the composition compared to other acid combinations, as demonstrated below in the Examples. In some embodiments the composition may include about 0.5% to about 5% lactic acid, or about 2% lactic acid, and about 0.5% to about 4% citric acid, or about 1% citric acid.

The nitrogen stabilizing composition also includes a combination of polysorbate 20 (TWEEN™ 20), and soy lecithin, which in combination with the aforementioned lactic acid the inventor has determined to provide exceptional coating properties for urea granules. In some embodiments the composition may include about 1% to about 10% polysorbate 20, or about 5% polysorbate 20, and about 0.1% to about 1% soy lecithin, or about 0.5% soy lecithin, and the aforementioned amounts of lactic acid.

In other embodiments, soy lecithin may for example be substituted with one or more of monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, diacetylated tartaric acid esters of monoglycerides, lecithins, lysolecithins, succinic acid esters of mono- and/or diglycerides, lactic acid esters of mono- and/or diglycerides, lecithins, lysolecitins, and sucrose esters of fatty acids, lecithin (e.g. canola lecithin, sunflower lecithin, and/or safflower lecithin), and lysolecithins.

In other embodiments, polysorbate 20 may for example be substituted with one or more of polysorbate 40 (TWEEN™ 40), polysorbate 60 (TWEEN™ 60) and polysorbate 80 (TWEEN™ 80).

The nitrogen stabilizing composition also includes monoethanolamine (MEA), which the inventor has determined enhances solubility of DMPP in the composition and also when the composition is applied in UAN solutions. In some embodiments the composition may include about 0.5% to 2% MEA, or about 1% MEA.

The nitrogen stabilizing composition may also include a vegetable oil, such as canola oil, for dust reduction as previously disclosed in U.S. Pat. Nos. 9,422,203 and 10,183,897, incorporated in their entirety herein by reference. In some embodiments the composition may include about 0.2% to 2% canola oil, or about 1% canola oil. In other embodiments the vegetable oil may, for example, be selected from one or more of corn oil, rapeseed oil, cottonseed oil, soybean oil and sunflower oil.

In some embodiments, the nitrogen stabilizing composition may include a micronutrient concentrate. The micronutrient concentrate includes caustic potash, methanol, iron, manganese, zinc and boron. In some embodiments the iron, manganese and zinc may be provided in a chelated form, such as FeEDDHA, MnEDTA and ZnEDTA. In some embodiments the boron may be provided as boric acid ($H_3BO_3$). In some embodiments, MnEDTA and ZnEDTA may be provided in a 1:1 ratio. In example embodiments, the micronutrient concentrate may include 64.2% to 87.8% water, 3% to 8% MnEDTA, 3% to 8% ZnEDTA, 3% to 8% $H_3Bo_3$, 2% to 8% methanol, 1% to 3% caustic potash and 0.2% to 0.8% FeEDDHA.

In some embodiments, the micronutrient concentrate may be formulated by reacting caustic potash with methanol to obtain potassium methanolate. The inventor has determined that methanol, iron, manganese, zinc and boron are stabilized in potassium methanolate.

In some embodiments, the compositions described herein can be provided in concentrate form (e.g., liquid, gel, or reconstitutable powder form), suitable for further dilution and/or mixing in water or other suitable diluent prior to application. In some embodiments, the compositions disclosed and described herein can be provided as a ready-to-use solution for direct application. In some embodiments, the compositions described herein can be combined with other fertilizer solutions, and thus are formulated to be diluted and/or reconstituted by mixing with such other solutions.

EXAMPLES

The invention can be further understood by reference to the following examples, which are provided by way of illustration and are not meant to be limiting.

In the following examples, an embodiment referred to by the inventor as Active Stabilizer Plus has the following formulation:
30% propylene glycol
20% N-methyl-2-pyrrolidone (NMP)
15.3% ethylene glycol
12% N-(n-butyl) thiophosphoric triamide (NBPT)
10% water
5% TWEEN™ 20 polysorbate surfactant
2% 3,4-dimethyl pyrazole phosphate (DMPP)
2% lactic acid
1% monoethanolamine (MEA)
1% citric acid
1% canola oil
0.5% Blue #1 dye
0.2% soy lecithin This formulation was found to be stable at room temperature for at least 12 months with no precipitation of NBPT.

Experiment 1

Experiment 1 tested ammonia emissions, nitrate leaching, nitrous oxide emissions, and wheat biomass yield of soil broadcast fertilized with urea coated with Active Stabilizer Plus at different application rates in a greenhouse setting. The trial was run to the heading stage. The soil had a loamy texture with a 8.1 pH and 6.5% organic matter content. The untreated sample was uncoated urea granules, and the three test samples were Active Stabilizer Plus applied to urea granules at the following application rates: 1.2 L/1000 kg, 1.8 L/1000 kg and 2.4 L/1000 kg.

Results are shown in FIG. 1. Treated samples compared to the untreated sample clearly showed reduction in ammonia volatilization (31-36% reduction), reduction in nitrate leaching (3-10% reduction), and increase in wheat biomass (7 to 9% increase). Nitrous oxide reduction was ambiguous.

Experiment 2

Experiment 2 tested ammonia emissions, nitrate leaching, nitrous oxide emissions, and wheat biomass yield of soil fertilized with urea ammonium nitrate (UAN) solution combined with Active Stabilizer Plus at different application rates in a greenhouse setting. The trial was run to the heading stage. The soil had a loamy texture with a 8.1 pH and 6.5% organic matter content. The untreated sample was UAN alone, and the three test samples were UAN combined with Active Stabilizer Plus at the following rates: 1 L/1000 L, 1.5 L/1000 L and 2 L/1000 L.

Results are shown in FIG. 2. Treated samples compared to the untreated sample clearly showed reduction in ammonia volatilization (17 to 32% reduction), reduction in nitrate leaching (4-25% reduction), and increase in wheat biomass (5 to 8% increase). Nitrous oxide reduction was ambiguous.

Experiment 3

Experiment 3 tested ammonia emissions, nitrate leaching, nitrous oxide emissions, and wheat biomass of soil band fertilized with urea coated with Active Stabilizer Plus at different application rates in a greenhouse setting. The trial was run to the heading stage. The soil had a loamy texture with a 8.1 pH and 6.5% organic matter content. The untreated sample was urea alone, and the three test samples were urea combined with Active Stabilizer Plus at the following rates: 1.2 L/1000 kg, 1.8 L/1000 kg and 2.4 L/1000 kg. The control sample was soil only without any treatment or urea.

Results are shown in FIG. 3. Treated samples compared to the untreated sample clearly showed reduction in nitrate leaching (1-30% reduction) and reduction in nitrous oxide (69-76% reduction). Ammonia volatilization increased and wheat biomass decreased but based on the control data these results may be attributable to components of the formulation other than NBPT and DMPP.

Experiment 4

Figure 5:
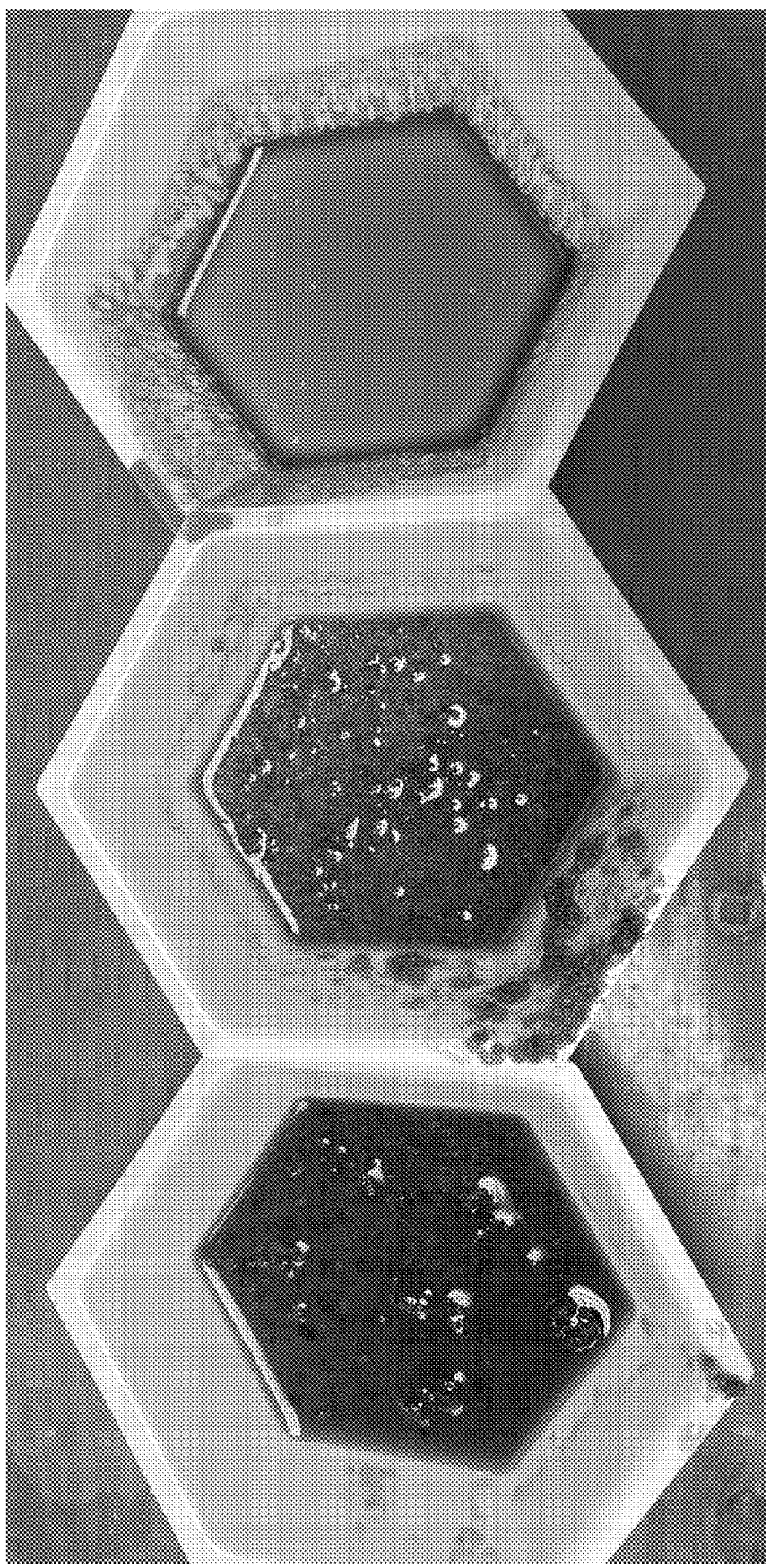
FIG. 5 is a close up photo showing the stability test results of FIG. 4.

Stability of different ratios of NBPT to DMPP were tested, and the results are shown in FIGS. 4 and 5. From left to right in the photos are shown (i) a modified formulation of Active Stabilizer Plus with 15% NBPT to 3% DMPP (5:1 NBPT:DMPP ratio), (ii) a modified formulation of Active Stabilizer Plus with 21% NBPT to 3% DMPP (7:1 NBPT:DMPP ratio), and (iii) unmodified Active Stabilizer Plus (6:1 NBPT:DMPP ratio). All three formulations were originally blue, clear and odorless. Over time, as shown, the two modified formulations changed to a greenish brown colour, with precipitation, and a strong rotten egg odor, while the unmodified formulation remained blue, clear and odorless.

Experiment 5

Stability of different acid combinations were tested, and the results are shown in FIG. 6. Modified formulations of Active Stabilizer Plus included combinations of 1% citric acid with: 1% and 2% hydrochloric acid, 1% and 2% sulfuric acid, 1% and 2% phosphoric acid, and 1% lactic acid. The bottom row of FIG. 6 shows data for unmodified Active Stabilizer Plus. As shown, superior stability was shown with unmodified Active Stabilizer Plus, and modified Active Stabilizer Plus where the lactic acid concentration was reduced from 2% to 1%, though slight separation of an oil layer was observed at 1 month after formulation. Citric acid combined with acids other than lactic acid all showed a separated oil layer and precipitation after one week after formulation.

In the following examples, Active Stabilizer Plus was modified by the addition of a micronutrient concentrate, according to the following formulation:
30% propylene glycol
20% N-methyl-2-pyrrolidone (NMP)
15.3% ethylene glycol
12% N-(n-butyl) thiophosphoric triamide (NBPT)
10% water
5% TWEEN™ 20 polysorbate surfactant
2% 3,4-dimethyl pyrazole phosphate (DMPP)
2% lactic acid
1% monoethanolamine (MEA)
1% citric acid
1% canola oil
0.5% Blue #1 dye
0.2% soy lecithin
0.058% micronutrient concentrate The micronutrient concentrate had the following formulation:
78% water
5% MnEDTA
5% ZnEDTA
5% $H_3BO_3$
4.5% methanol
2% caustic potash
0.5% FeEDDHA Experiment 5

The foregoing micronutrient concentrate was evaluated in experiments wherein canola seeds were treated with the concentrate. The proteomics of seedlings were evaluated. Roots and shoots were harvested separately and prepared for proteomics analysis. Plants from treated seeds showed a significantly increased number of upregulated protein groups in both root and shoot tissues compared to the control. Without being bound theory, the inventor believes the methanolate-chelated micronutrient complexes upregulate the genes responsible for the upregulated protein groups. These upregulated protein groups include many responsible for embryogenesis, early germination, root development and abiotic stress resistance. These upregulated protein groups and their specific functions are set out below:

| Protein groups upregulated in the treatment group | |
|---|---|
| Protein group | Function |
| AT2G45470 | Fasciclin-like arabinogalactan protein. Possibly involved in embryogenesis and seed development. |
| AT2G45640 | Involved in the regulation of salt stress. Expression of AtSAP18 is induced by NaCl, cold, drought, ABA, and ethylene treatment. |
| AT2G45790 | Encodes a cytoplasmic phosphomannomutase, involved in ascorbate biosynthesis |
| AT2G39800 | Encodes a delta1-pyrroline-5-carboxylate synthase that catalyzes the rate-limiting enzyme in the biosynthesis of proline. Gene is expressed in reproductive organs and tissues under non-stress conditions but in the whole plant under water-limiting condition. Expression is also induced by abscisic acid and salt stress in a light-dependent manner. encodes a delta1-pyrroline-5-carboxylate synthase that catalyzes the rate-limiting enzyme in the biosynthesis of proline. Gene is expressed in reproductive organs and tissues under non-stress conditions but in the whole plant under water-limiting condition. Expression is also induced by abscisic acid and salt stress in a light-dependent manner. P5CS1 appears to be involved in salt stress responses related to proline accumulation, including protection from reactive oxidative species. P5CS1 appears to be present in different cells and/or different subcellular locations from P5CS2 in a tissue-dependent manner. |
| AT2G39795 | Mitochondrial glycoprotein family protein; (source: Araport11) |
| AT2G39480 | Encodes a delta1-pyrroline-5-carboxylate synthase that catalyzes the rate-limiting enzyme in the biosynthesis of proline. Gene is expressed in reproductive organs and tissues under non-stress conditions but in the whole plant under water-limiting condition. Expression is also induced by abscisic acid and salt stress in a light-dependent manner. encodes a delta1-pyrroline-5-carboxylate synthase that catalyzes the rate-limiting enzyme in the biosynthesis of proline. Gene is expressed in reproductive organs and tissues under non-stress conditions but in the whole plant under water-limiting condition. Expression is also induced by abscisic acid and salt stress in a light-dependent manner. P5CS1 appears to be involved in salt stress responses related to proline accumulation, including protection from reactive oxidative species. P5CS1 appears to be present in different cells and/or different subcellular locations from P5CS2 in a tissue-dependent manner. |
| AT2G39270 | Mitochondrial glycoprotein family protein; (source: Araport11) |
| AT2G38280 | P-loop containing nucleoside triphosphate hydrolases superfamily protein; (source: Araport11) |

Protein groups upregulated in the treatment group

| Protein group | Function |
|---|---|
| AT2G38280 | Encodes a protein with in vitro AMP deaminase activity that is involved in embryogenesis. Homozygous mutant embryos fail to develop past the zygote stage. |
| AT2G36850 | Encodes GSL8, a member of the Glucan Synthase-Like (GSL) family believed to be involved in the synthesis of the cell wall component callose. GSL8 is required for male gametophyte development and plant growth. Has a role in entry of microspores into mitosis. Also refer to GSL10 (At3g07160). |
| AT2G36390 | Encodes a starch branching enzyme (EC.2.4.1.18) similar to SBE2 from maize and rice. Expressed throughout plant tissues. The mRNA is cell-to-cell mobile. |
| AT4G19830 | FKBP-like peptidyl-prolyl cis-trans isomerase family protein; (source: Araport11) |
| AT2G35490 | Involved in photoprotection of photosystem II. |
| AT2G35040 | AICARFT/IMPCHase bienzyme family protein; (source: Araport11) |
| AT2G33340 | Encodes MAC3B, a U-box proteins with homology to the yeast and human E3 ubiquitin ligase Prp19. Associated with the MOS4-Associated Complex (MAC). Involved in plant innate immunity. |
| AT2G32290 | Beta-amylase 6; (source: Araport11) |
| AT2G32600 | Hydroxyproline-rich glycoprotein family protein; (source: Araport11) |
| AT2G30790 | Encodes a 23 kD extrinsic protein that is part of photosystem II and participates in the regulation of oxygen evolution. |
| AT2G29560 | Encodes a putative phosphoenolpyruvate enolase that is localized both to the nucleus and the cytoplasm. The mRNA is cell-to-cell mobile. |
| AT5G36170 | Required for normal processing of polycistronic plastidial transcripts |
| AT1G53210 | Protein kinase superfamily protein; (source: Araport11). often play broadly conserved regulatory roles in metabolism and cell division, although functions of plant homologues have often diverged from their metazoan counterparts. |
| AT1G53165 | alpha/beta-Hydrolases superfamily protein; (source: Araport11) |
| AT1G52440 | Contains a novel calcium-binding repeat sequence. Binds TSK in vitro. Localizes to small cytoplasmic vesicles in interphase cells. In cells synchronized for cell division, TSA1 and TSK relocate to ends of spindle microtubules that are ahead of separating chromatids during metaphase and anaphase of mitosis. May be involved in mitosis together with TSK. Expressed preferentially in the flower and shoot apex. Can form multimers. The mRNA is cell-to-cell mobile. |
| AT1G52410 | Related to TOR proteins from yeast and mammals, regulators of cell growth in response to nutrient availability. TOR proteins belong to the family of phosphatidylinositol 3-kinase and are targets of the antiproliferative drug rapamycin. AtTOR binds the yeast FKBP12 protein in the presence of Rapamycin, is involved in embryogenesis and is expressed in embryos, endosperm and meristems. |
| AT1G50030 | Encodes a phosphatidylinositol 4-kinase that is expressed in inflorescences and shoots. |
| AT1G48850 | Chorismate synthase, putative/5-enolpyruvylshikimate-3-phosphate phospholyase; (source: Araport11) |
| AT1G48620 | This gene is predicted to encodes a histone H1/H5 family member. A plant line expressing an RNAi construct targeted against HON5 shows a reduced level of agrobacterium-mediated root transformation. |
| AT1G43890 | RAB GTPASE HOMOLOG B18; (source: Araport11) |
| AT1G32500 | Encodes a member of a heterogenous group of non-intrinsic ATP-binding cassette (ABC) proteins. Members of this group bear no close resemblance to each other nor to representatives of specific ABC protein subfamilies from other organisms. This grouping is arbitrary and will likely change upon acquisition of further data. |
| AT1G32440 | Encodes a chloroplast pyruvate kinase beta subunit. The enzyme is less active than the other chloroplast pyruvate kinase beta subunit encoded by AT5G52920. Involved in seed oil biosynthesis. Can partially complement the AT5G52920 mutant. |
| AT1G32210 | Encodes protein involved in suppression of apoptosis. Complements a mammalian apoptosis suppressor mutation. |
| AT1G32080 | Encodes a plant LrgAB/CidAB protein localized to the chloroplast envelope that is involved in chloroplast development, carbon partitioning, ABA/drought response, and leaf senescence. The gene may have evolved from gene fusion of bacterial lrgA and lrgB. |
| AT3G22890 | Encodes ATP sulfurylase, the first enzyme in the sulfate assimilation pathway of Arabidopsis. It may also participate in selenium metabolism. The mRNA is cell-to-cell mobile. |
| AT3G22590 | Encodes PLANT HOMOLOGOUS TO PARAFIBROMIN (PHP), a homolog of human Paf1 Complex (Paf1C) subunit Parafibromin. Human Parafibromin assists in mediating output from the Wnt signaling pathway, and dysfunction of the encoding gene HRPT2 conditions specific cancer-related disease phenotypes. PHP resides in a ~670-kDa protein complex in nuclear extracts, and physically interacts with other known Paf1C-related proteins in vivo. Loss of PHP specifically conditioned accelerated phase transition from vegetative growth to flowering and resulted in misregulation of a very limited subset of genes that included the flowering repressor FLOWERING LOCUS C (FLC). Member of PAF-C complex. |

-continued

| Protein groups upregulated in the treatment group | |
|---|---|
| Protein group | Function |
| AT3G21550 | Transmembrane protein, putative (DUF679 domain membrane protein 2); (source: Araport11) |
| AT3G20920 | Encodes an endoplasmic reticulum localized protein with similarity to yeast Sec62p. Mutants display growth defects and significantly reduced fertility. AtSec62 does not complement the thermosensitive phenotype of yeast Sec62 mutants. |
| AT3G20790 | NAD(P)-binding Rossmann-fold superfamily protein; (source: Araport11) |
| AT3G20440 | Encodes BE1, a putative glycoside hydrolase. Involved in organogenesis and somatic embryogenesis by regulating carbohydrate metabolism. Mutation in BE1 has pleotrophic effect on the whole plant development. |
| AT3G20330 | Encodes aspartate carbamoyltransferase catalyzing the second step in the denovo pyrimidine ribonucleotide biosynthesis |
| AT3G19820 | Involved in the conversion of the early brassinosteroid precursor 24-methylenecholesterol to campesterol. Brassinosteroids affect cellular elongation. Mutants have dwarf phenotype. DWF1 is a Ca2+-dependent calmodulin-binding protein. |
| AT3G19320 | Leucine-rich repeat (LRR) family protein; (source: Araport11) |
| AT3G18680 | Encodes a functional UMP Kinase located in the plastid that binds to group II intron plastid transcription products. Mutants show decreased accumulation of target transcripts/proteins. |
| AT3G18580 | Member of the family of canonical mitochondrial DNA binding proteins. Single-stranded binding protein which does not interfere with MMEJ. |
| AT3G17820 | Encodes a cytosolic glutamine synthetase, the enzyme has low affinity with substrate ammonium The mRNA is cell-to-cell mobile. |
| AT3G17040 | It is a RNA tetratricopeptide repeat-containing protein required for normal processing of transcripts from the polycistronic chloroplast psbB-psbT-psbH-petB-petD operon coding for proteins of the photosystem II and cytochrome b6/f complexes. Localizes to the chloroplast membrane. Involved in regulating plastidial gene expression and biogenesis. It binds in the psbT?psbH intercistronic region and blocks the progression of 5' → 3' exoribonucleases, which defines the 5' end of processed psbH transcripts and also stabilizes the downstream RNA segment. In addition, HCF107 binding remodels the structure of the psbH 5' UTR in a way that can account for its ability to enhance psbH translation. |
| AT3G16940 | Calmodulin-binding transcription activator; (source: Araport11) |
| AT3G16910 | Encodes a peroxisomal protein with acetyl-CoA synthetase activity that is responsible for the activation of acetate for entry into the glyoxylate cycle. |
| AT3G16620 | Component of TOC complex, plastid protein import machinery. |
| AT3G16520 | UDP-glucosyl transferase 88A1; (source: Araport11) |
| AT3G16200 | DNA-directed RNA polymerase subunit beta; (source: Araport11) |
| AT3G16060 | ATP binding microtubule motor family protein; (source: Araport11) |
| AT3G15850 | Chloroplastic enzyme responsible for the synthesis of 16:1 fatty acids from galactolipids and sulpholipids. Uses ferredoxin as electron donor. The mRNA is cell-to-cell mobile. |
| AT3G15450 | Aluminum induced protein with YGL and LRDR motifs; (source: Araport11) |
| AT3G14900 | hypothetical protein; (source: Araport11) |
| AT3G13930 | Encodes a subunit of the mitochondrial pyruvate dehydrogenase complex. |
| AT3G13290 | Varicose-like protein; (source: Araport11) |
| AT3G12800 | Short-chain dehydrogenase-reductase B; (source: Araport11) |
| AT3G12290 | MTHFD1 encodes a cytoplasmic bifunctional methylenetetrahydrofolate dehydrogenase/methenyltetrahydrofolate cyclohydrolase that is involved in one carbon metabolism and control of DNA methylation. |
| AT3G12080 | Encodes a putative plastid-targeted GTP-binding protein that is essential for embryogenesis and chloroplast development. |
| AT3G12050 | Aha1 domain-containing protein; (source: Araport11) |
| AT3G11930 | Adenine nucleotide alpha hydrolases-like superfamily protein; (source: Araport11) |
| AT3G11780 | MD-2-related lipid recognition domain-containing protein/ML domain-containing protein; (source: Araport11) |
| AT3G11630 | Encodes a 2-Cys peroxiredoxin (2-Cys PrxA) that contains two catalytic Cys residues. Functions in redox cascade with TrxL2 via the ferredoxin-thioredoxin reductase (FTR)/thioredoxin (Trx) pathway to mediate the light-responsive reductive control of target proteins. Continuously transfers reducing power from TrxL2 to H2O2. |
| AT3G11590 | Golgin family A protein; (source: Araport11) |
| AT3G11450 | Encodes a ZRF1 chromatin regulator. Functions in regulating plant growth and development. |
| AT3G11400 | One of the 2 genes that code for the G subunit of eukaryotic initiation factor 3 (EIF3). The mRNA is cell-to-cell mobile. |
| AT3G11130 | Encodes an arginyl-tRNA:protein arginyltransferase (ATE2), a component of the N-end rule pathway that targets protein degradation through the identity of the amino-terminal residue of specific protein substrates. Arabidopsis contains two ATE genes: At5g05700/ATE1, At3g11240/ATE2. Another component of the N-end rule pathway is At5g02310/PROTEOLYSIS6 (PRT6). PRT6 and ATE were shown to regulate seed after-ripening, seedling sugar sensitivity, seedling lipid |

Protein groups upregulated in the treatment group

| Protein group | Function |
|---|---|
| | breakdown, and abscisic acid (ABA) sensitivity of germination. ATE2 has also been show to be involved in the response to pathogens. |
| AT3G11070 | Outer membrane OMP85 family protein; (source: Araport11) |
| AT3G10940 | Encodes a protein with a predicted dual-specificity phosphatase domain, similar to the glucan phosphorylases SEX4 and LSF1, however, it lacks the carbohydrate binding domain present in those proteins. Has phosphoglucan phosphatase activity. It binds to starch and specifically hydrolyzes phosphate from the C3-position. |
| AT3G10850 | Glyoxalase II cytoplasmic isozyme (Glx2-2) mRNA, complete |
| AT3G10660 | Predicted to encode calcium-dependent protein kinase and is localized to the ER. Protein is myristoylated in a cell-free extract. Changing the proposed myristoylated site, G residue in the amino terminal, to A prevented the meristoylation. The G to A mutation decreased AtCPK2 membrane association by approximately 50%. |
| AT1G66240 | Homolog of anti-oxidant 1; (source: Araport11) |
| AT3G10570 | Cytochrome P450, family 77, subfamily A, polypeptide 6; (source: Araport11) |
| AT3G10060 | FKBP-like peptidyl-prolyl cis-trans isomerase family protein; (source: Araport11) |
| AT3G09840 | Encodes a cell division cycle protein, a member of AAA-type ATPases gene family. Expressed throughout the plant in regions of cell division. Within the cell, sub-cellular localization varies depending on the stage of the cell cycle. Mutants in which the expression of CDC48A is altered show defects in cytokinesis, cell expansion and cell differentiation. The mRNA is cell-to-cell mobile. |
| AT3G09800 | SNARE-like superfamily protein; (source: Araport11) |
| AT5G02870 | Ribosomal protein L4/L1 family; (source: Araport11) |
| AT3G08947 | ARM repeat superfamily protein; (source: Araport11) |
| AT3G08740 | elongation factor P (EF-P) family protein; (source: Araport11) |
| AT3G08030 | The mRNA of this gene is expressed in viable seeds. Its detection in a dry seed lot has potential for use as a molecular marker for germination performance as absence of expression correlates with decreased germination. Encodes DUF642 cell wall protein. |
| AT3G07700 | ABC1K7 is a member of an atypical protein kinase family that is induced by salt stress. Loss of function mutations affect the metabolic profile of chloroplast lipids. It appears to function along with ABC1K8 in mediating lipid membrane changes in response to stress. |
| AT3G07630 | Encodes a plastid-localized arogenate dehydratase involved in phenylalanine biosynthesis. Not less than six genes encoding ADT were identified in the Arabidopsis genome: ADT1 [At1g11790]; ADT2 [At3g07630]; ADT3 [At2g27820]; ADT4 [At3g44720]; ADT5 [At5g22630]; and ADT6 [At1g08250]. |
| AT3G07480 | 2Fe-2S ferredoxin-like superfamily protein; (source: Araport11) |
| AT3G06530 | ARM repeat superfamily protein; (source: Araport11) |
| AT3G06400 | Encodes PPR2, a pentatricopeptide repeat protein. Binds to plastid 23S rRNA and plays an important role in the first mitotic division during gametogenesis and in cell proliferation during embryogenesis. |
| AT3G06040 | Ribosomal protein L12/ATP-dependent Clp protease adaptor protein ClpS family protein; (source: Araport11) |
| AT3G04880 | Encodes a novel protein involved in DNA repair from UV damage. Isolated by functional complementation of E. coli UV-sensitive mutants (UVR genes). |
| AT3G04840 | Ribosomal protein S3Ae; (source: Araport11) |
| AT3G04790 | Ribose 5-phosphate isomerase, type A protein; (source: Araport11) |
| AT3G03480 | acetyl CoA: (Z)-3-hexen-1-ol acetyltransferase; (source: Araport11) |
| AT3G03330 | NAD(P)-binding Rossmann-fold superfamily protein; (source: Araport11) |
| AT3G03320 | RNA-binding ASCH domain protein; (source: Araport11) |
| AT3G03250 | Is thought to encode a cytosolic UDP-glucose pyrophosphorylase with strong similarity to potato UTP--glucose-1-phosphate uridylyltransferase. Downregulated by flooding. |
| AT3G02950 | Encodes a component of the putative Arabidopsis THO/TREX complex: THO1 or HPR1 (At5g09860), THO2 (At1g24706), THO3 or TEX1 (At5g56130), THO5 (At5g42920, At1g45233), THO6 (At2g19430), and THO7 (At5g16790, At3g02950). THO/TREX complexes in animals have been implicated in the transport of mRNA precursors. Mutants of THO3/TEX1, THO1, THO6 accumulate reduced amount of small interfering (si)RNA, suggesting a role of the putative Arabidopsis THO/TREX in siRNA biosynthesis. |
| AT3G02530 | TCP-1/cpn60 chaperonin family protein; (source: Araport11) |
| AT3G02875 | Hydrolyzes amino acid conjugates of the plant growth regulator indole-3-acetic acid (IAA), including IAA-Leu and IAA-Phe. Uses Mg and Co ions as cofactors. |
| AT3G02870 | Encodes a L-galactose-1-phosphate phosphatase, involved in ascorbate biosynthesis. |
| AT1G54080 | Oligouridylate-binding protein 1A; (source: Araport11) |
| AT1G54020 | GDSL-motif esterase/acyltransferase/lipase. Enzyme group with broad substrate specificity that may catalyze acyltransfer or hydrolase reactions with lipid and non-lipid substrates. |
| AT1G53750 | 26S proteasome AAA-ATPase subunit RPT1a (RPT1a) mRNA, |
| AT1G79920 | Heat shock protein 70 (Hsp 70) family protein; (source: Araport11) |
| AT1G52410 | Contains a novel calcium-binding repeat sequence. Binds TSK in vitro. Localizes |

Protein groups upregulated in the treatment group

| Protein group | Function |
|---|---|
| | to small cytoplasmic vesicles in interphase cells. In cells synchronized for cell division, TSA1 and TSK relocalize to ends of spindle microtubules that are ahead of separating chromatids during metaphase and anaphase of mitosis. May be involved in mitosis together with TSK. Expressed preferentially in the flower and shoot apex. Can form multimers. The mRNA is cell-to-cell mobile. |
| AT1G52400 | Encodes a member of glycosyl hydrolase family 1, located in inducible ER bodies which were formed after wounding, required in inducible ER body formation The mRNA is cell-to-cell mobile. |
| AT1G52280 | RAB GTPase homolog G3D; (source: Araport11) |
| AT1G52260 | Encodes a protein disulfide isomerase-like (PDIL) protein, a member of a multigene family within the thioredoxin (TRX) superfamily. Unlike several other PDI family members, transcript levels for this gene are not up-regulated in response to three different chemical inducers of ER stress (dithiothreitol, beta-mercaptoethanol, and tunicamycin). |
| AT1G50670 | OTU-like cysteine protease family protein; (source: Araport11) |
| AT1G50450 | Saccharopine dehydrogenase; (source: Araport11) |
| AT1G50320 | Encodes a prokaryotic thioredoxin |
| AT1G50320 | Encodes a prokaryotic thioredoxin |
| AT1G50200 | Alanyl-tRNA synthetase; (source: Araport11) |
| AT1G49760 | Polyadenylate-binding protein, putative/PABP, putative, similar to poly(A)-binding protein GB: AAF66825 GI: 7673359 from (Nicotiana tabacum). Highly and ubiquitously expressed. Member of the class II PABP family. |
| AT1G48610 | AT hook motif-containing protein; (source: Araport11) |
| AT1G48600 | Encodes a phosphoethanolamine N-methyltransferase that catalyses the last two methylation steps of the three sequential methylations of phosphoethanolamine (PEA) that are required for the synthesis of phosphocholine (PCho) in plants. |
| AT1G48420 | Encodes an enzyme that decomposes D-cysteine into pyruvate, H2S, and NH3. Only D-cysteine but not L-cysteine was converted by D-CDes to pyruvate, H2S, and NH3. There is conflicting evidence on its 1-aminocyclopropane-1-carboxylate deaminase activity. Involved in regulating ethylene levels. |
| AT1G48090 | Calcium-dependent lipid-binding family protein; (source: Araport11) |
| AT1G07990 | SIT4 phosphatase-associated family protein; (source: Araport11) |
| AT1G08125 | S-adenosyl-L-methionine-dependent methyltransferases superfamily protein; (source: Araport11) |
| AT1G08470 | Although this enzyme is predicted to encode a strictosidine synthase (SS), it lacks a conserved catalytic glutamate residue found in active SS enzymes and it is not expected to have SS activity. |
| AT1G08480 | Encodes subunit 6 of mitochondrial complex II (succinate dehydrogenase complex) and participates in the respiratory chain. It contributes to anchoring succinate dehydrogenase to the inner mitochondrial membrane. The mRNA is cell-to-cell mobile. |
| AT1G08530 | Chitinase-like protein; (source: Araport11) |
| AT1G08550 | Violaxanthin deepoxidase involved in xanthophyll cycle. Two major consequences of the npq1 mutation are the absence of zeaxanthin formation in strong light and the partial inhibition of the quenching of singlet excited chlorophylls in the photosystem II light-harvesting complex |
| AT1G09180 | A member of ARF-like GTPase family. A thaliana has 21 members, in two subfamilies, ARF and ARF-like (ARL) GTPases. |
| AT1G09310 | plant/protein (Protein of unknown function, DUF538); (source: Araport11) |
| AT1G09640 | Translation elongation factor EF1B, gamma chain; (source: Araport11) |
| AT1G09770 | Member of MYB3R-and R2R3-type MYB-encoding genes. Essential for plant innate immunity. Interacts with MOS4 and PRL1. The mRNA is cell-to-cell mobile. |
| AT1G09795 | ATP phosphoribosyl transferase, catalyses first step of histidine biosynthesis |
| AT1G09830 | Glycinamide ribonucleotide synthetase (GAR synthetase) that catalyzes the conversion of phosphoribosyl amine to phosphoribosyl glycineamide |
| AT1G10060 | Encodes a mitochondrial branched-chain amino acid aminotransferase. Complements the yeast leu/iso-leu/val auxotrophy mutant. |
| AT1G10370 | Encodes GSTU17 (Glutathione S-Transferase U17). Functions as a negative component of stress-mediated signal transduction pathways in drought and salt stress responses. |
| AT1G10417 | Encodes protein with unknown function whose expression is repressed by inoculation with Agrobacterium tumerifaciens. |
| AT1G10730 | Clathrin adaptor complexes medium subunit family protein; (source: Araport11) |
| AT1G10870 | A member of ARF GAP domain (AGD), A thaliana has 15 members, grouped into four classes. AGD4 belongs to the Class 1, together with AGD1, AGD2, and AGD3. |
| AT1G11260 | Encodes a H+/hexose cotransporter. The mRNA is cell-to-cell mobile. |
| AT1G11660 | heat shock protein 70 (Hsp 70) family protein; (source: Araport11) |
| AT1G11770 | Encodes an oligogalacturonide oxidase that inactivates the elicitor-active oligogalacturonides (OGs). |
| AT1G12900 | Glyceraldehyde 3-phosphate dehydrogenase A subunit 2; (source: Araport11) |
| AT1G12800 | SDP is a chloroplast localized RNA binding protein that is required for plastid rRNA processing. Plants harboring a mutation in SDP have numerous defects |

| Protein group | Function |
|---|---|
| | including reduced chlorophyll content, poor growth, yellow leaves and abnormal chloroplasts. |
| AT1G12240 | Encodes a vacuolar invertase betaFruct4. betaFruct4 is transported from the endoplasmic reticulum through the intermediate compartments as a membrane protein. The N-terminal cytoplasmic domain contains multiple sequence motifs that are involved at various stages in the trafficking of betaFruct4 from the ER to the central vacuole. The mRNA is cell-to-cell mobile. |
| AT1G12000 | Phosphofructokinase family protein; (source: Araport11) |
| AT1G13630 | Tetratricopeptide repeat (TPR)-like superfamily protein; (source: Araport11) |
| AT1G14320 | Encodes a ribosomal protein L10 and may be involved in translation regulation. Semi-dominant mutations in SAC552 can suppress defects in acaulis5, which encodes a thermospermine synthase, by enhancing translation of acl5 and itself. |
| AT1G14360 | UDP-galactose transporter 3; (source: Araport11) |
| AT1G14380 | Encodes a microtubule-associated protein. Member of IQ67 (CaM binding) domain containing family. |
| AT1G14610 | Valyl-tRNA synthetase/valine-tRNA ligase (VALRS); (source: Araport11) |
| AT1G14640 | SWAP (Suppressor-of-White-APricot)/surp domain-containing protein; (source: Araport11) |
| AT1G14810 | Encodes an aspartate semialdehyde dehydrogenase, which produces the branch point intermediate for lysine and threonine/methionine biosynthesis |
| AT1G15500 | TLC ATP/ADP transporter; (source: Araport11) |
| AT1G15540 | 2-oxoglutarate-dependent dioxygenase-like protein; (source: Araport11) |
| AT1G15730 | Cobalamin biosynthesis CobW-like protein; (source: Araport11) |
| AT1G15820 | Light harvesting complex photosystem II subunit 6; (source: Araport11) |
| AT1G15980 | Encodes a novel subunit of the chloroplast NAD(P)H dehydrogenase complex, involved in cyclic electron flow around photosystem I to produce ATP. |
| AT1G16790 | ribosomal protein-like protein; (source: Araport11) |
| AT1G16880 | Encodes a ACT domain-containing protein. The ACT domain, named after bacterial aspartate kinase, chorismate mutase and TyrA (prephenate dehydrogenase), is a regulatory domain that serves as an amino acid-binding site in feedback-regulated amino acid metabolic enzymes. The mRNA is cell-to-cell mobile. |
| AT1G17170 | Encodes glutathione transferase belonging to the tau class of GSTs. Naming convention according to Wagner et al. (2002). It is involved in the detoxification of the environmental pollutant 2,4,6-trinitrotoluene. Arabidopsis plants over-expressing At1g17170 were more resistant to TNT, removed more TNT from sterile and soil-based media, and had reduced levels of glutathione when grown in the presence of TNT. |
| AT1G17290 | Encodes for alanine aminotransferase (ALAAT1), involved in alanine catabolism during plants recovery from hypoxia The mRNA is cell-to-cell mobile. |

This application is intended to cover any variations, uses, or adaptations of the invention using its general principles. Further, this application is intended to cover such departures from the present disclosures as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A nitrogen stabilizing composition comprising:
6% to 18% N-(n-butyl) thiophosphoric triamide (NBPT);
1% to 6% 3,4-dimethyl pyrazole phosphate (DMPP); and
a solvent,
wherein the ratio of NBPT to DMPP is between 5.5:1 and 6.5:1.

2. A composition according to claim 1, wherein the ratio of NBPT to DMPP is 6:1.

3. A composition according to claim 2, comprising 12% NBPT and 2% DMPP.

4. A composition according to claim 1, comprising lactic acid and citric acid.

5. A composition according to claim 4, comprising 0.5% to 5% lactic acid and 0.5% to 4% citric acid.

6. A composition according to claim 5, comprising 2% lactic acid and 1% citric acid.

7. A composition according to claim 1, comprising polysorbate 20, lactic acid and soy lecithin.

8. A composition according to claim 7, comprising 1% to 10% polysorbate 20, 0.5% to 5% lactic acid and 0.1% to 1% soy lecithin.

9. A composition according to claim 8, comprising 5% polysorbate 20, 2% lactic acid and 0.2% soy lecithin.

10. A composition according to claim 1, comprising monoethanolamine (MEA).

11. A composition according to claim 10, comprising 0.5% to 2% MEA.

12. A composition according to claim 11, comprising 1% MEA.

13. A composition according to claim 1, comprising a micronutrient concentrate comprising potassium methanolate, chelated zinc, chelated manganese, boron and chelated iron.

14. A composition according to claim 13 wherein the ratio of chelated zinc to chelated manganese is 1:1.

15. A nitrogen stabilizing composition comprising:
6% to 18% N-(n-butyl) thiophosphoric triamide (NBPT);
1% to 6% 3,4-dimethyl pyrazole phosphate (DMPP),
wherein the ratio of NBPT to DMPP is between 5.5:1 and 6.5:1;

1% to 10% polysorbate 20;
0.5% to 5% lactic acid;
0.5% to 4% citric acid;
0.5% to 2% monoethanolamine (MEA);
0.1% to 1% soy lecithin;
0.1% to 1% micronutrient concentrate comprising potassium methanolate, chelated zinc, chelated manganese, boron and chelated iron; and
a solvent.

16. A composition according to claim 14 wherein the ratio of NBPT to DMPP is 6:1.

17. A composition according to claim 15, comprising:
12% NBPT;
2% DMPP;
2% lactic acid;
1% citric acid;
5% polysorbate 20;
0.2% soy lecithin;
1% MEA;
0.058% of the micronutrient concentrate; and
wherein the solvent comprises N-methyl-2-pyrrolidone (NMP), propylene glycol and ethylene glycol.

\* \* \* \* \*